(12) United States Patent
Deboer et al.

(10) Patent No.: US 8,700,693 B2
(45) Date of Patent: Apr. 15, 2014

(54) EXTENSIBLE MECHANISM FOR EXECUTING SERVER SIDE CODE

(75) Inventors: Timothy Gerrit Deboer, Toronto (CA); Timothy Marc Francis, Newmarket (CA); Derek Tai-Wah Koo, Toronto (CA); Sheldon Bradley Wosnick, Richmond Hill (CA); Elson Siu Chung Yuen, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 2223 days.

(21) Appl. No.: 10/718,297

(22) Filed: Nov. 20, 2003

(65) Prior Publication Data

US 2004/0193682 A1 Sep. 30, 2004

(30) Foreign Application Priority Data

Mar. 26, 2003 (CA) ..................................... 2423517

(51) Int. Cl.
*G06F 15/16* (2006.01)
(52) U.S. Cl.
USPC ........................................................ 709/203
(58) Field of Classification Search
USPC ................................................. 709/313, 203
See application file for complete search history.

(56) References Cited

U.S. PATENT DOCUMENTS

| 5,987,245 | A | * | 11/1999 | Gish | 719/310 |
| 6,336,115 | B1 | | 1/2002 | Tominaga et al. | 707/10 |
| 6,363,433 | B1 | * | 3/2002 | Nakajima | 719/313 |
| 2002/0078168 | A1 | * | 6/2002 | Christfort et al. | 709/217 |
| 2004/0205772 | A1 | * | 10/2004 | Uszok et al. | 719/317 |

\* cited by examiner

*Primary Examiner* — Jerry Dennison
(74) *Attorney, Agent, or Firm* — Yee & Associates, P.C.; David A. Mims, Jr.

(57) ABSTRACT

An extensible mechanism for executing code on one of one or more servers and in association with one of one or more client applications (i.e. "clients"). In accordance with a model of the extensible mechanism, the execution of server side code is partitioned into three stages, a view stage for determining the code for running, a server stage for determining the server to execute the code and a launcher stage to determine the client for interacting with the server to run the code. Lists of processing elements at each stage extensibly configure the mechanism to work with different types of server side code to be run, different servers to run the code and different clients with which to interact with the server running the code. By modeling the execution of server side code in stages and using lists of processing elements, the mechanism is easily extended to new code types, servers and launchers. The extensible mechanism can be plugged into or otherwise adapt another application, for example, an integrated development environment.

32 Claims, 4 Drawing Sheets

EXTENSIBLE MECHANISM FOR EXECUTING SERVER SIDE CODE

TECHNICAL FIELD

The invention relates to client/server computing and more particularly to an extensible mechanism for processing computing code on the server side.

BACKGROUND OF THE INVENTION

The client/server environment typically consists of both server and client-side services providing a distributed computing model in which client applications request services from server applications. An example of a client/server system is a business application that allows a user to access information on a central database server. Another example of client/server environment is a web environment that includes a continuously growing number of different applications for web environment support, including web browsers, web servers, launchers, etc. A variety of web resources such as Hyper Text Markup Language (HTML) files, Java Servlet Pages (JSP™), Java™ classes and Servlets™, Enterprise Java Beans™ (EJB), Extensible Markup Language (XML) deployment descriptors makes the task of application development and debugging more complicated and time consuming, especially if more than one developer is involved in a project. An integrated development environment (IDE) is usually used to assist in developing relatively large and complex software products for a client server environment. A developer is usually responsible for developing a piece or module of the final software application. Such a module must be written and debugged prior to its implementation into the final product for seamless integration with other modules. Another problem related to testing of the final product is based on the necessity of using a number of client server environment support applications such as web browsers, application servers, etc. Variations between particular client server environment support applications such as the differences between two application servers from different sources makes the task of a developer more complex, because the developer, in addition to engineering compatibility with other modules of the business applicant, has to provide compatibility with a number of different servers and web browsers. Testing the compatibility of one or more development resources with one or more servers or one or more client side applications can consume a great amount of the developer's time which extends the duration of product development and makes the product more expensive.

A solution to some or all of these shortcomings is therefore desired.

SUMMARY OF THE INVENTION

The present invention is directed to an extensible mechanism for execution server side code in a client server environment.

Therefore, according to an aspect of the invention there is provided a method of executing server side code in a client server environment. The method comprises: processing an input object identifying code for executing on a server, said processing using a view list of at least one input object element, each input object element processing a type of code identified by the input object to output a deployable object; processing the deployable object using a server list of at least one server element to determine a server for executing the code, each server element enabling the deployable object to execute on a particular server and outputting a launchable object; and processing the launchable object using a launcher list of at least one client element to determine a client for launching the code on the particular server. The method may further comprise launching the client determined in response to the launchable object and executing the code on the particular server.

In accordance with a feature of the invention, at least one of the view list, server list and launcher list is extensible to accommodate additional respective elements. The method may further comprise maintaining at least one of the view list, server list and launcher list.

Accordingly, the step of processing the input object may comprise: analyzing the input object to determine an input object element for processing the input object; and processing the input object using the determined input object element. The step of processing the deployable object may comprise: analyzing the deployable object to determine a server element for processing the deployable object; and processing the deployable object using the determined server element. The step of processing the launchable object may comprise analysing the launchable object to determine a client element for processing the launchable object; and processing the launchable object using the determined client element.

According to another aspect of the invention there is provided an extensible mechanism for executing server side code in a client server environment comprising: a view mechanism for processing an input object identifying code for executing on a server and outputting a deployable object; a server mechanism for processing the deployable object to determine a particular server for executing the code and to enable the deployable object to execute on the particular server, said second mechanism outputting a launchable object; and a launcher mechanism for processing the launchable object to determine a client for launching the code on the particular server. Accordingly, the view mechanism may comprise a view list of at least one input object element, each input object element processing a type of code identified by the input object for outputting the deployable object. The view list is extensible to accommodate additional respective elements.

Further, the server mechanism may comprise a server list of at least one server element, each server element enabling the deployable object to execute on a particular server and processing the deployable object for outputting a launchable object. The server list is extensible to accommodate additional respective elements.

Also the launcher mechanism may comprise a launcher list of at least one client element, each client element enabling the launchable object to execute on a particular client for launching the code on the particular server. The launcher list is extensible to accommodate additional respective elements.

In accordance with a feature of the invention, the extensible mechanism is adaptable to launch the client determined in response to the launchable object for executing the code on the particular server.

Also, the extensible mechanism may be adapted to be integrated into an integrated development environment.

There is provided, in accordance with an aspect of the invention, a computer program product embodied in a computer readable medium for instructing a computer system to perform a method in accordance with the invention herein. Further, there is provided a computer readable medium storing data and instructions readable by a computer system, said computer system executing an integrated development environment (IDE) for generating code for executing in a client server environment, said data and instructions defining an extensible mechanism for executing said code on a server that, when deployed on said computer system, adapts said IDE to: process an input object identifying code for executing on a server, said processing using a view list of at least one input object element, each input object element processing a type of code identified by the input object to output a deployable object; process the deployable object using a server list of at least one server element to determine a server for executing the code, each server element enabling the deployable object to execute on a particular server and outputting a launchable object; and process the launchable object using a launcher list of at least one client element to determine a client for launching the code on the particular server.

In accordance with yet a further aspect of the invention, there is a method of maintaining an extensible mechanism for executing server side code in a client server environment. The method comprises maintaining at least one of: a view list of at least one input object element, each input object element processing a type of code identified by the input object to output a deployable object; a server list of at least one server element to determine a server for executing the code, each server element enabling the deployable object to execute on a particular server and outputting a launchable object; and a launcher list of at least one client element to determine a client for launching the code on the particular server. In accordance with feature of this aspect, maintaining comprises at least one of: generating a respective element for; adding a respective element to; configuring a respective element of; and deleting a respective element from; at least one of the view list, server list and launcher list. Further, this method may comprise executing server side code using at least one of the view list, server list and launcher list.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
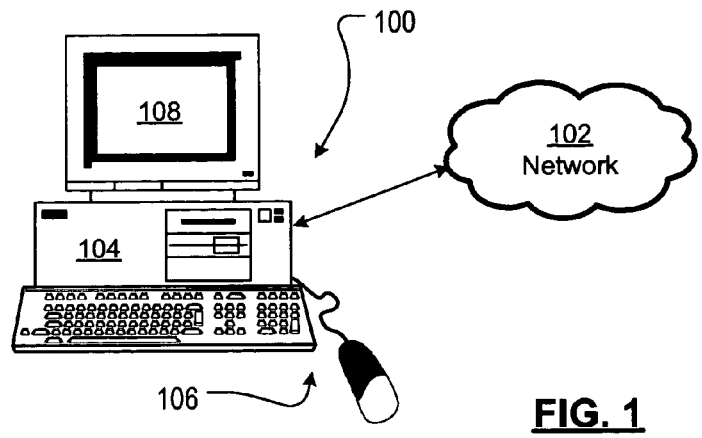
FIG. 1 schematically illustrates a computer system embodying aspects of the invention.

An embodiment of the invention, computer system 100, is illustrated in FIG. 1. Computer system 100, which is illustrated for exemplary purposes as a computing device, is adapted to communicate with other computing devices (not shown) using network 102. As will be appreciated by those of ordinary skill in the art, network 102 may be embodied using conventional networking technologies and may include one or more of the following: local networks, wide area networks, intranets, the Internet, and the like.

Through the description herein, an embodiment of the invention is illustrated with aspects of the invention embodied solely on computer system 100. As will be appreciated by those of ordinary skill in the art, aspects of the invention may be distributed among one or more networked computing devices which interact with computer system 100, using one or more networks such as, for example network 102. However, for ease of understanding, aspects of the invention have been embodied in a single computing device—computer system 100.

Computing device 100 typically includes a processing system 104 which is enabled to communicate with the network 102, various input devices 106, and output devices 108. Input devices 106, (a keyboard and a mouse are shown) may also include a scanner, an imaging system (e.g., a camera, etc.), or the like. Similarly, output devices 108 (only a display is illustrated) may also include printers and the like. Additionally, combination input/output (I/O) devices may also be in communication with processing system 104. Examples of conventional I/O devices (not shown in FIG. 1) include removable recordable media (e.g., floppy disk drives, tape drives, CD-ROM drives, DVD-RW drives, etc.), touch screen displays, and the like.

Figure 2:
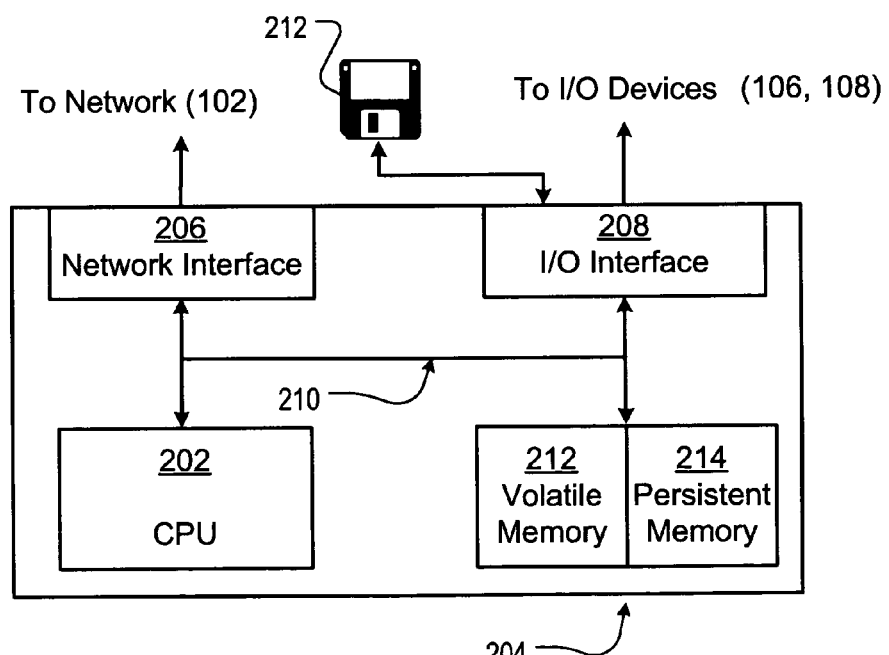
FIG. 2 schematically illustrates in greater detail, a portion of the computer system of FIG. 1.

Exemplary processing system 104 is illustrated in greater detail in FIG. 2. As illustrated, processing system 104 includes a number of components: a central processing unit (CPU) 202; memory 204; network interface (I/F) 206; and input-output interface (I/O I/F) 208. Communication between various components of the processing system 104 may be facilitated via a suitable communications bus 210 as required.

CPU 202 is a processing unit, such as an Intel Pentium™, IBM PowerPC™, Sun Microsystems UltraSparc™ processor, or the like, suitable for the operations described herein. As will be appreciated by those of ordinary skill in the art, other embodiments of processing system 104 could use alternative CPUs and may include embodiments in which one or more CPUs are employed (not shown). CPU 202 may include various support circuits to enable communication between itself and the other components of processing system 104.

Memory 204 includes both volatile memory 212 and persistent memory 214 for the storage of: operational instructions for execution by CPU 202; data registers; application and thread storage; and the like. Memory 204 preferably includes a combination of random access memory (RAM), read only memory (ROM), and persistent memory such as that provided by a hard disk drive.

Network I/F 206 enables communication between other computing devices (not shown) and other network computing devices via network 102. Network I/F 206 may be embodied in one or more conventional communication devices. Examples of a conventional communication device include: an Ethernet card; a token ring card; a modem, or the like. Network I/F 206 may also enable the retrieval or transmission of instructions for execution by CPU 202, from or to a remote storage media or device via network 102.

I/O I/F 208 enables communication between processing system 104 and the various I/O devices 106 and 108. I/O I/F 208 may include, for example a video card for interfacing with an external display such as output device 108. Additionally, I/O I/F 208 may enable communication between processing system 104 and a removable/readable media 212. Removable/readable media 212 may comprise a conventional diskette or other removable memory devices such as Zip™ drives, flash cards, CD-ROMs, static memory devices, and the like. Removable/readable media 212 may be used to provide instructions for execution by CPU 202 or as a removable data storage device.

Figure 3:
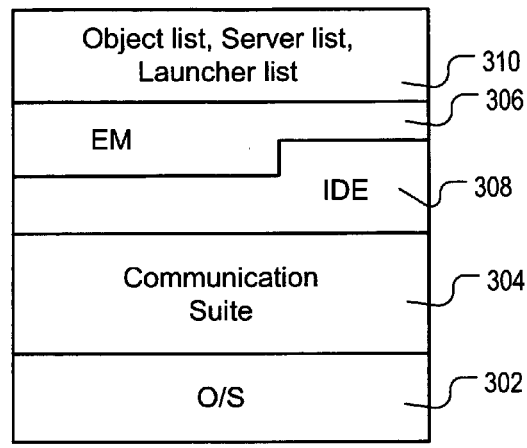
FIG. 3 illustrates in functional block form, a portion of the memory illustrated in FIG. 2.

The computer instructions/applications stored in memory 204 and executed by CPU 202 (thus adapting the operation of computer system 100 as described herein) are illustrated in functional block form in FIG. 3. As will be appreciated by those of ordinary skill in the art, the discrimination between aspects of the applications illustrated as functional blocks in FIG. 3, is somewhat arbitrary in that the various operations attributed to a particular application as described herein may, in an_alternative embodiment, be subsumed by another application.

As illustrated for exemplary purposes only, memory 204 stores a number of applications and data for enabling the operation of system 100 to provide an extensible mechanism for executing server side code; namely: an operating system (OS) 302, a communication suite 304, an integrated development environment (IDE) 308, an extensible mechanism (EM) 306 for executing server side code which plugs into or adapts IDE 306, and EM lists, collectively 310, for EM 306 comprising a view list of input object elements 310a, a server list of server elements 310b and a launcher list of client elements 310c.

OS 302 is an operating system suitable for operation with a selected CPU 202 and the operations described herein. Multi-tasking, multi-threaded OSes such as, for example IBM AIX™, Microsoft Windows, Linux, or the like, are expected to be preferred in many embodiments. Communication suite 304 provides, through interaction with OS 302 and network I/F 206 (FIG. 2) suitable communication protocols to enable communication with other networked computing devices via network 110 (FIG. 1). Communication suite 304 may include one or more of such protocols such as TCP/IP, Ethernet, token ring and the like.

IDE 308 is an application for generating code, such as a business application, for running in a client server environment. IDE 308 includes various editors, tools and wizards for, among other things, creating code, deploying code to a server and testing such code. IDE 308 is adapted to provide a user interface such as a graphical user interface (GUI) for such operations as is well known to persons of ordinary skill in the art.

EM 306 using the EM lists 310, provides a mechanism for executing server side code on one of one or more servers and in association with one of one or more client applications (i.e. "clients"). In accordance with a model of EM 306, the execution of server side code is partitioned into three stages, the view stage for determining the code for running, the server stage for determining the server to execute the code and the launcher stage to determine the client for interacting with the server to run the code. EM lists 310 extensibly configure EM 306 to work with different types of server side code to be run (per view list 310a), different servers to run the code (per server list 310b) and different clients with which to interact with the server running the code (per launcher list 310c). The EM lists 310 each comprise one or more respective elements. Each element provides an interface for receiving an input to the element and provides for the processing of the input to produce an output for processing by elements of subsequent stages in the EM model as described further below.

By modeling the execution of server side code in three stages EM 306 enables the use of different servers and launchers for executing different code types and provides a mechanism to easily add additional or modify existing servers, launchers and code types to EM 306. As described further herein below, each of the EM lists 310a, 310b, 310c of respective input object, server and client elements may be maintained independently of one another and are extensible. For example, a server element for enabling execution of code on a particular server may be added to server list 310b or an existing element in such list amended without regard to the elements of lists 310a and 310c.

As will be understood by persons skilled in the art, elements in the lists may be implemented as XML documents (or other descriptive language document), Java code objects or other coded objects or modules (e.g. C/C++) or combinations thereof (e.g. a Java code object and XML document). The inputs and outputs therefore may also comprise similar structures such as XML documents, Java code objects or combinations thereof.

Figure 4:
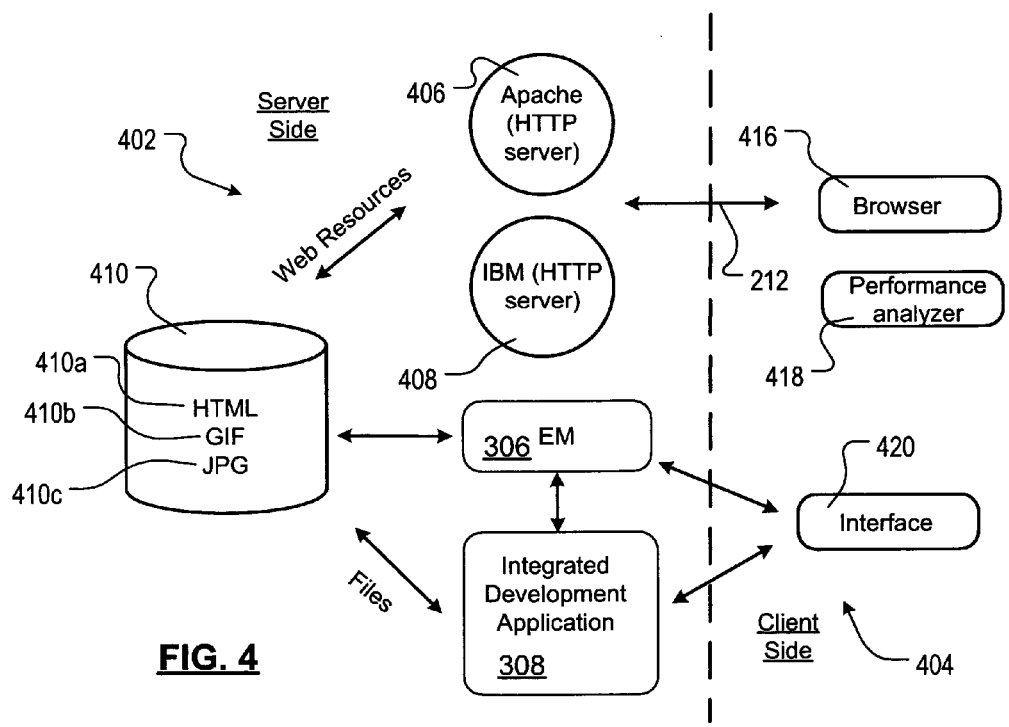
FIG. 4 illustrates a schematic diagram of a system for executing server side code associated with a predetermined type of a web resource.

FIG. 4 illustrates a schematic diagram of an exemplary structure of a client-server environment and EM 306 integrated in IDE 308. A well known client-server environment is a web environment based on a server side part 402 and a client side part 404 shown schematically separated by a dotted line. The illustrated client-server environment for exemplary purposes is embodied using one computing system 100, but it must be understood by those of ordinary skill in the art that the environment may be distributed among one or more computing devices which are enabled to interact with each other using a network such as network 102.

Server side part 402 typically comprises at least one server (two exemplary HTTP servers 406 and 408 are illustrated) providing an environment on which to run different code. Such code collectively 410 may comprise a variety of different types of resources such as HTML files, JSPs, Java classes and Servlets, EJBs, XML deployment descriptors, graphic files, video, animation and audio files, etc. Three types of resources are shown for illustrative purposes e.g. an HTML file 410a, a GIF file 410b and a JPG file 410c. Client side 404 comprises client side code that interacts with a server running the code to perform some function, for example, access to one or more resources. The client side code may be an application such as an Internet browser, an FTP client, a background process, etc. In the illustrated diagram the client side part 404 comprises exemplary client side code, namely a browser 416 and performance analyzer 418 that are compatible with at least one of servers 406, 408. The applications of the server side and client side are enabled to communicate with each other using a standard protocol such as Hyper Text Transfer Protocol, File Transfer Protocol (FTP) or Simple Object Access Protocol (SOAP) over HTTP.

Figure 5:
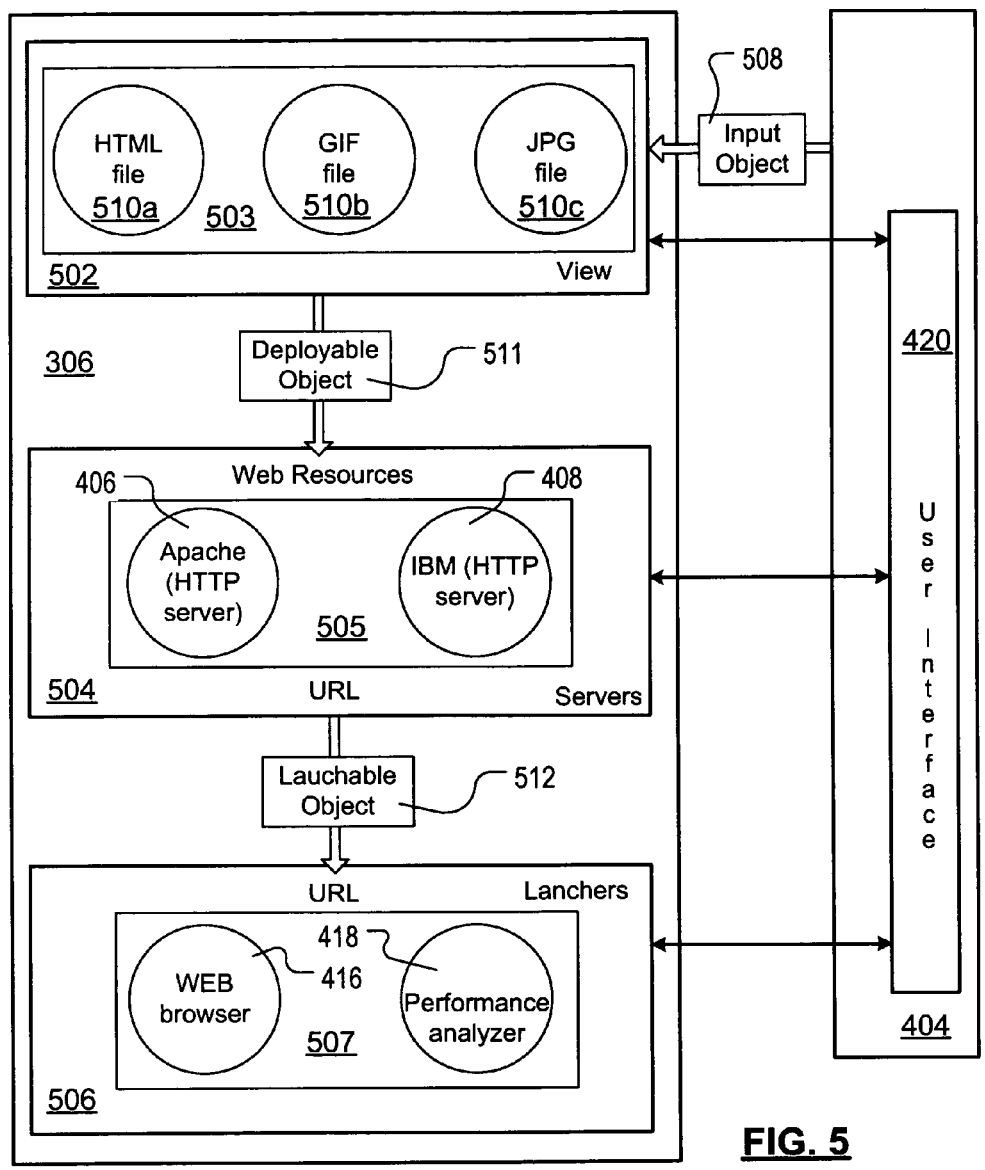
FIG. 5 illustrates a schematic block diagram of a portion of the memory of FIG. 3.

FIG. 5 illustrates a schematic block diagram 500 of EM 306. EM 306 comprises a view module 502, a server module 504 and a launcher module 506. Each of the modules 502, 504 and 506 may be implemented as a reusable piece of computer code with specific inputs and outputs. The modules 502, 504 and 506 are preferably adapted to be plugged in and/or removed easily from an application, for example, IDE 308. Each of the modules 502, 504 and 506 is adapted by a corresponding EM list 310a, 301 band 310c to handle respective inputs and produce respective outputs for handling by subsequent modules in accordance with the EM model described above.

In order to describe operations and features of EM 306 and system 100, the following definitions are used. A deployable object is an output, such as a Java code object, XML document etc., that contains information about code to be run on an as yet unidentified server. Depending on the type of code to be run, the deployable object therefore contains enough information to publish the code to a server (though not necessarily a specific server) and may contain information on what the resource is "contained" in, (i.e. how it is packaged). For example, a deployable object for an HTIP file may contain a filename or other identifier to construct a Universal Resource Locator (URL) for the HTML file to be run on an HTIP server. A launchable object is an output, such as a Java code object, XML document etc., that contains information on how to access code to be run (i.e. a specific resource) on a particular server, and information about how to route access to the resource, (e.g. firewalls and/or the type of client application that can be used to access the web resource) if the access information is not sufficiently clear. For example, a URL may be constructed and provided to direct access to the resource when a Web browser is intended to consume the object. However, a specific resource may require a specific plug-in in a browser that supports the specific resource. For example, an HTML file may have a Macromedia Shockwave™ reference. In order to fully display the HTML page, a browser intended to display the page requires an appropriate Macromedia Shockwave™ plug-in installed. The launchable object for such an HTML page contains information specifying that the HTML file requires a browser having Macromedia Shockwave™ plug-in installed. Also, a launchable object may contain information such as a URL and an IP address and/or port number.

View module 502 is adapted to receive (e.g. from a user selection via user interface 420), an input object 508, which could be some text in an editor, an object or file in a file manager, an item from a combo box, etc. View module 502 is adapted by view list 310a of elements for processing input objects which elements are used to identify a particular input object and configure it for execution on a server outputting in response to the input object a deployable object 511 for further handling by server module 504. View list 310a, for exemplary purposes, comprises only three elements for three types of input objects, namely HTML 503a, GIF 503b and JPG 503c. View module 502 is adapted to communicate with user interface 420 in order to notify a user about processing of the input object or to receive user input for an input object such as input specifying a type of resource if view module 502 is unable to recognize the input.

Server module 504, is adapted to receive deployable object 511 from view module 502 for further processing to run the code identified by the deployable object on a particular server. Sever module 504 is adapted by server list 310b to prepare the desired code for execution on at least one of one or more servers enabled by the elements of server list 310b and to output a launchable object for further processing by launcher module 506. In FIG. 4 only two exemplary servers are available to system 100 namely, Apache HTTP server 406 and IBM HTTP server 408). Server list 310b is configured with elements 505b and 505b respectively enabling each of these servers in the EM model. If the received deployable object 511 is recognized by at least one of the elements 505b and 505b, server module 504 adapted by the element outputs a launchable object 512 that provides the information needed to access the deployable object 511 on the particular server 406 or 408.

Server module 504 is adapted to communicate with user interface 420 in order to notify the user about the processing of the deployable object 511, for example to facilitate the selection of a particular server 406 or 408 when more than one element may handle the deployable object or to specify the deployable object 512 as a specific type of deployable object, if server module 504 is unable to automatically recognize the input. If server module 504 cannot recognize the deployable object 511, a launchable object 512 is not output.

Launcher module 506, is adapted to receive launchable object 512, and launch an appropriate client on the client side 404 for that particular type of launchable object 512. Launcher module 506 is adapted by launcher list 310c of client elements which enable various clients. Exemplary launcher list 310c comprises a Web browser element 507a and a performance analyzer element 507b for respectively launching web browser 416 or performance analyzer 418 in response to appropriate launchable objects. Launcher module 504 is adapted to communicate with user interface 420 in order to notify the user about processing of the launchable object 512, or to specify the launchable object 512 as a specific type of launchable object, if the launcher module 506 is unable to recognize the input.

Figure 6:
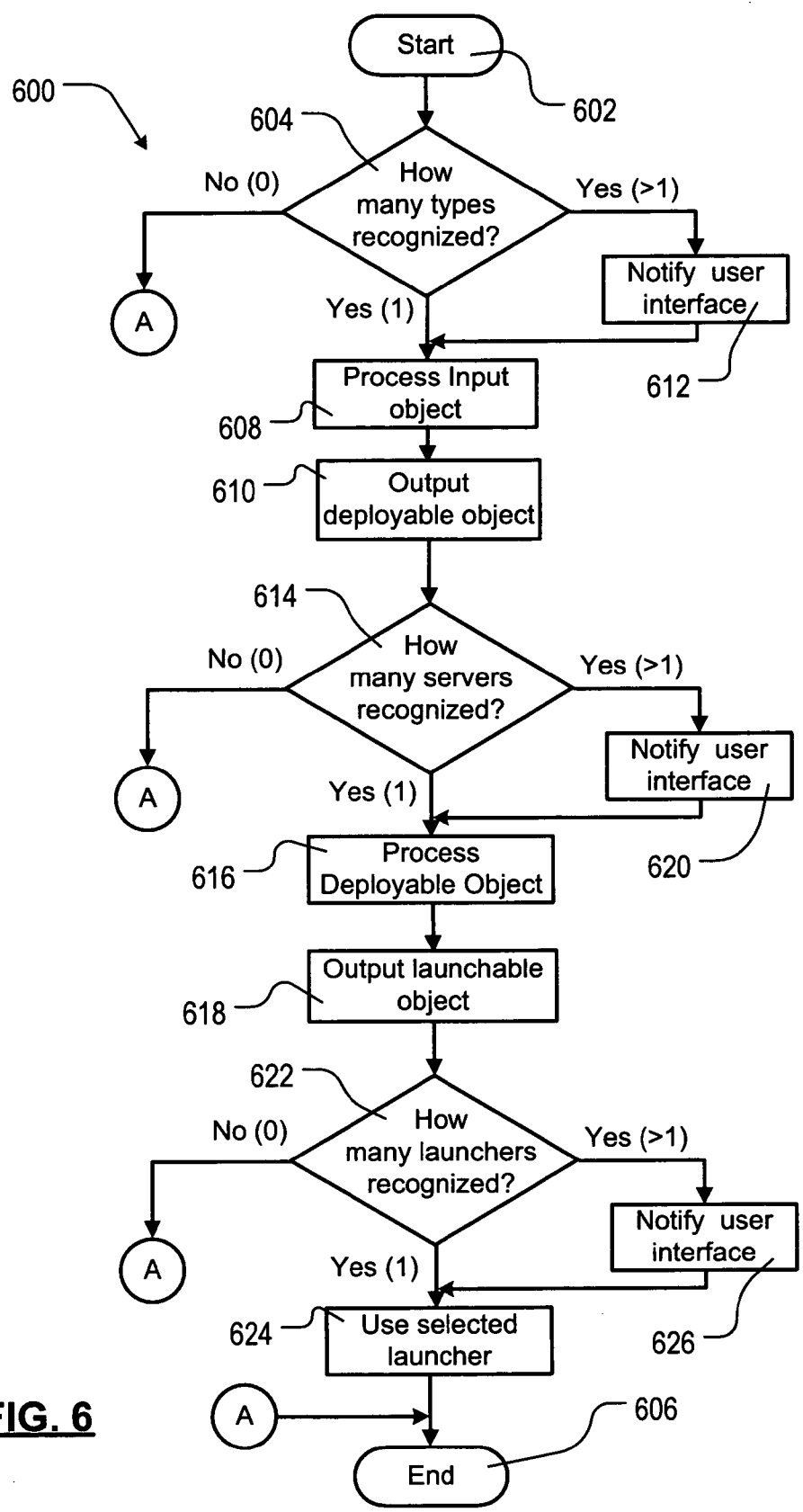
FIG. 6 illustrates operations in accordance with the invention for processing an input object.

FIG. 6 illustrates a flow chart 600 of the main steps of operations for executing server side code associated with a type of resource in accordance with an aspect of the invention.

After beginning operation, (step 602) an input object is selected, for example, by a user using the user interface 420. Such an interface may be an IDE interface for developing code to be run on one or more types of servers in communication with one or more client side applications. Persons of ordinary skill in the art will appreciate that code under development often requires testing in a client-server environment and that the present invention may be useful to facilitate such testing.

The selected object 508 could be some text in an editor, an object or a file in a file manager, an item from a combo box, etc. Operations identify input object 506 (step 604), using view list 310a of elements for handling input objects. If input object 508 is not recognized, e.g. characteristics of input object 508 do not match at least one type of input object for which view module is pre-configured using view list 310a, the input object cannot be configured for running on a server and execution of the operations is ended (step 606). If input object 508 is recognized and can be associated with only one type of web resource included in view list 310a, input object 508 is processed (step 608) as defined by the element of view list 310a and a deployable object 511 is output (step 610).

If input object 508 is recognized but is associated with more than one element of view list 310a, the user ay be prompted by a notifying message via user interface 420 to select the element that is to handle the input object 508 for further processing (step 608). On receipt of the selection from the user interface 420, a deployable object 511 is output (step 610). If user interface 420 does not specify a type of input, input object 508 cannot be run and thus execution of the method is ended (step 606).

On receipt of the deployable object 510, server module 504 adapted by elements of server list 310b identifies a server that can be used to run the received deployable object (step 614). If there are no servers that can be used, deployable object 511 cannot be run and the operations are ended (step 606). If there is only one server identified as compatible with deployable object 511, the identified server is started (step 616) in order to run deployable object 511. The code to be run may be published to the server if so enabled by the element. A launchable object 512 (step 618) is output to launcher module 506. If more than one server is identified as being compatible with the deployable object, server module 504 displays the list of available servers to the user and allows the user to select one server (step 620). On receipt of the user's selection, processing proceeds as described for an identified server. If user interface 420 does not specify a type of server, input object 508 cannot be run and thus execution of operations is ended (step 606).

On receipt of launchable object 512, launcher module 506 identifies client side code ("clients") that can be used for interacting with the server running the code (step 622). If there are no clients that can be used, launchable object 512 cannot be run and execution is ended (step 606). If only one client is identified as compatible with launchable object 512, the identified client is started (step 624) in order to run the launchable object 512. If more than one client is identified as compatible with the launchable object, launcher module 506 displays the list of available clients to the user and allows the user to select one (step 626). On receipt of the user's selection, the selected client is started in order to run launchable object 512. If no client is identified, processing ends (step 606).

As a result of the extensible nature of the EM model, an element may be added to one of the EM lists 310 for which there may not be a suitable element in one or more of the other lists. For example, a new server element may be added to server list 310b for which no suitable client element yet exists in launcher list 310c. In order to support enhanced service for a user and avoid a situation wherein a choice is presented at one stage and then on the next stage the use is notified that the choice cannot be competed, in one embodiment of the invention, EM 306 is configured to pre-check the compatibility of inputs (e.g. input object 508, deployable object 511 and launchable object 512) with each corresponding module (e.g. view module 502, server module 504 and launcher module 506) prior the actual processing of input object and displaying dialogs to the user. The system programmatically traces through possible outcomes of the steps to ensure that each step will be allowed to go all the way through. If a given input cannot go through at least each of one of the view module, server module or launcher module, the system does not process the input and will notify the user that the selection cannot be processed.

Persons skilled in the art will appreciate that numerous modifications to the above described embodiment are possible while remaining within the scope of the invention. For example, the exemplary embodiment describes a user interface for selecting code to be run and resolving the determination of particular elements to process inputs at stages of the EM model. However, other embodiments may include pre-determined preferences specified earlier by the user for determining among different elements or may employ operations for automatically choosing a "best" element or autonomic programming techniques. The list of elements may be ordered whereby the first element matching the input is used.

EM lists 310 may be maintained or modified in a variety of manners such as through IDE 308 adapted to edit the lists. IDE wizards or tools may be provided to configure new elements or edit old ones, providing an interface to receive certain parameters and descriptors and generate appropriate elements to EM lists 310. Such elements may be created independently without IDE assistance and imported or combined with EM lists 310. An element of an EM list may be created or configured manually using a simple text editor or a special editor such as one adapted for editting XML. A tool or other application for creating or configuring a view, server or launcher to be enabled by the present invention may be adapted to generate some or part of an element for one of the EM lists 310. How each of EM lists 310 is stored is not important, per se. For example, one of EM lists 310, such as view list 310A, could be an XML file. The other EM lists 310 could be Java code. Importantly to support extensibility, at least some of EM lists can be modified, configured, or extended.

Extensibility is advantageous for a number of reasons. A small change to just one of EM lists 310 (e.g. to add a new launcher) can open up a new path for launching a different resource type. When each of EM lists 310 is populated, adding a single element to server list 310B, for example, might provide full support for running and launching all resources on that specific server type, even with very little new code or development for whoever created the server element. As such, the present invention may facilitate less development and testing time and less complexity through modularity (adding a new server type does not require the developer to know or re-implement views and launchers). Extending one of EM lists 310 may provide additional benefits beyond those originally contemplated. For example, a developer may add a view for a particular server and in doing so, provide the view to other servers automatically.

A further embodiment may permit EM lists 310 to be modified during the runtime of EM 306. For example, a user could be prompted when selecting a new resource type that doesn't work, and they can select, create, or configure a new server/launcher/etc. to handle the input.

The embodiment(s) of the invention described above is(are) intended to be exemplary only. The scope of the invention is therefore intended to be limited solely by the scope of the appended claims.

We claim:

1. A method of executing code in an integrated development environment, the method comprising:

providing the integrated development environment with an extensible mechanism for handling a plurality of codes, a plurality of servers, and a plurality of clients comprising a partitioning execution of server side code into three stages comprising, a view stage for determining code and a type of code to be run, a server stage for determining a yet unidentified server to execute the type of code determined, and a launcher stage to determine a client for interacting with the particular server to run the type of code determined and a set of lists comprising a view list of input object elements, a server list of server elements and a launcher list of client elements, wherein each of the lists is modifiable enabling the extensible mechanism to handle new codes and a new type of code;

identifying an input object on a client system, wherein the input object identifies the type of code from the plurality of codes for executing on the yet unidentified server of the plurality of servers, and wherein one type of code in the plurality of codes is configured for executing on one particular server;

determining whether a pre-check of compatibility of inputs including input objects, deployable object and launchable objects with each corresponding module including a view module, server module and launcher module is satisfied;

responsive to a determination the pre-check of compatibility is satisfied, processing the input object to identify the type of code for executing on the yet unidentified server;

generating, in response to identifying the type of code for executing on the yet unidentified server, instructions for accessing the type of code for executing on the yet unidentified server;

processing the instructions to determine a particular server of the plurality of servers on which to execute the code;

enabling the particular server to access the code;

identifying, based on the type of code identified, one of a plurality of client applications for allowing the particular server to interact with the client system during processing of the code for executing on the particular server of the plurality of servers; and processing the code for executing on the particular server.

2. The method of claim 1 wherein processing the input object to identify the type of code for executing on the yet unidentified server includes using the view list of input elements for processing the type of code identified by the input object, processing the instructions generated includes using the server list of server elements for determining the particular server, and identifying the one of the plurality of client applications includes using the launcher list of client elements for launching the one of the plurality of client applications.

3. The method of claim 2 wherein at least one of the view list, server list and launcher list is extensible to accommodate additional respective elements and wherein the at least one of the view list, server list and launcher list is extensible during run time of the extensible mechanism.

4. The method of claim 2 comprising maintaining at least one of the view list, server list and launcher list.

5. The method of claim 4 wherein the step of maintaining at least one of the view list, server list and launcher list comprises extending any of the view list, server list and launcher list, wherein extending the server list includes adding a view including an additional server and automatically propagating the view added to other servers.

6. The method of claim 1 wherein processing the input object comprises:
  analyzing the input object to determine an input object element for processing the input object, wherein the analyzing further comprises using one of predetermined preferences specified by a user, automatically electing a best element, and an ordered list of elements wherein the element used is the first element matching the input object; and
  processing the input object using the determined input object element.

7. The method of claim 6 including processing user input to determine the input object element.

8. The method of claim 1 wherein processing the generated instructions further comprises:
  analyzing a server element for enabling a deployable object; and
  processing the deployable object using the determined server element.

9. The method of claim 8 including processing user input to determine the server element.

10. The method of claim 1 wherein identifying the one of the plurality of client applications comprises:
  analyzing a launchable object to determine a client element for processing the launchable object; and
  processing the launchable object using the determined client element.

11. The method of claim 10 including processing user input to determine the client element.

12. An apparatus for an extensible mechanism for an integrated development environment, the apparatus comprising:
  a communications bus;
  a memory, connected to the communications bus, having instructions for an extensible mechanism for an integrated development environment stored thereon;
  a central processing unit connected to the communications bus, wherein the central processing unit executes the instructions stored in the memory to direct the apparatus to:
  create the extensible mechanism for handling a plurality of codes, a plurality of servers, and a plurality of clients comprising a partitioning execution of server side code into three stages comprising, a view stage for determining code and a type of code to be run, a server stage for determining a yet unidentified server to execute the type of code determined, and a launcher stage to determine a client for interacting with the particular server to run the type of code determined and a set of lists comprising a view list of input object elements, a server list of server elements and a launcher list of client elements, wherein each of the lists is modifiable enabling the extensible mechanism to handle new codes and a new type of code, the extensible mechanism further comprising:
  a view mechanism determining whether a pre-check of compatibility of inputs including input objects, deployable object and launchable objects with each corresponding module including a view module, server module and launcher module is satisfied before processing an input object identifying a type of code from a plurality of codes, wherein one type of code is configured for executing on one yet unidentified server, for executing on the yet unidentified server of a plurality of servers and outputting a deployable object, wherein the extensible mechanism further generates, in response to identifying the type of code for executing on the yet unidentified server, instructions for accessing the type of code for executing on the yet unidentified server;
  a server mechanism for processing the deployable object to determine a particular server of the plurality of servers for executing the instructions for accessing the type of code for the code and to enable the deployable object to execute on the particular server, said server mechanism outputting a launchable object; and
  a launcher mechanism for processing the launchable object to determine one of a plurality of client applications for launching the code based on the type of code identified on the particular server.

13. The extensible mechanism of claim 12 wherein said view mechanism comprises a view list of input object elements, each input object element processing the type of code identified by the input object for outputting the deployable object.

14. The extensible mechanism of claim 13 wherein said view list is extensible to accommodate additional respective elements and wherein the view list is extensible during run time of the extensible mechanism.

15. The extensible mechanism of claim 12 wherein said server mechanism comprises a server list of server elements, each server element enabling the deployable object to execute on the particular server and processing the deployable object for outputting the launchable object.

16. The extensible mechanism of claim 15 wherein said server list is extensible to accommodate additional respective elements, wherein extending the server list includes adding a view including an additional server and automatically propagating the view added to other servers.

17. The extensible mechanism of claim 12 wherein said launcher mechanism comprises a launcher list client elements, each client element enabling the launchable object to execute on a particular client for launching the code on the particular server.

18. The extensible mechanism of claim 17 wherein said launcher list is extensible to accommodate additional respective elements.

19. The extensible mechanism of claim 12 wherein said extensible mechanism is adapted to launch the one of the plurality of client applications determined in response to the launchable object for executing the code on the particular server of the plurality of servers.

20. The extensible mechanism of claim 12 wherein the view mechanism is extensible to accommodate a plurality of new code types, the server mechanism is extensible to accommodate a plurality of new servers, and the launcher mechanism is extensible to accommodate a plurality of new client applications.

21. The extensible mechanism of claim 12 wherein said view mechanism is adapted to analyze the input object to determine an input object element for processing the input object, wherein to analyze further comprises using one of predetermined preferences specified by a user, automatically electing a best element, and an ordered list of elements wherein the element used is the first element matching the input object and process the input object using the determined input object element.

22. The extensible mechanism of claim 21 wherein said view mechanism is further adapted for processing user input to determine the input object element.

23. The extensible mechanism of claim 12 wherein said server mechanism is adapted to analyze the deployable object to determine a server element for processing the deployable object; and process the deployable object using the determined server element.

24. The extensible mechanism of claim 23 wherein said server mechanism is further adapted for processing user input to determine the server element.

25. The extensible mechanism of claim 21 wherein said launcher mechanism is adapted to analyze the launchable object to determine a client element for processing the launchable object; and process the launchable object using the determined client element.

26. The extensible mechanism of claim 25 wherein said launcher mechanism is further adapted for processing user input to determine the client element.

27. The extensible mechanism of claim 12 wherein said extensible mechanism is adapted to be integrated into an integrated development environment.

28. A computer program product for generating code for executing in a client-server environment, the computer program product comprising:
a non-transitory computer readable medium having instructions stored thereon to be executed by a processor of a computer system, the instructions comprising;
instructions for executing an integrated development environment (IDE) for generating code for executing in the client-server environment, said instructions for defining an extensible mechanism for handling a plurality of codes, a plurality of servers, and a plurality of clients comprising a partitioning execution of server side code into three stages comprising, a view stage for determining code and a type of code to be run, a server stage for determining a yet unidentified server to execute the type of code determined, and a launcher stage to determine a client for interacting with the particular server to run the type of code determined and a set of lists comprising a view list of input object elements, a server list of server elements and a launcher list of client elements, wherein each of the lists is modifiable enabling the extensible mechanism to handle new codes and a type of code;
instructions for identifying an input object on a client system, wherein the input object identifies the type of code from the plurality of codes for executing on the yet unidentified server of the plurality of servers, and wherein one type of code in the plurality of codes is configured for executing on one yet unidentified server;
instructions for determining whether a pre-check of compatibility of inputs including input objects, deployable object and launchable objects with each corresponding module including a view module, server module and launcher module is satisfied;
instructions responsive to a determination the pre-check of compatibility is satisfied, for processing the input object to identify the type of code for executing on the yet unidentified server;
instructions for generating, in response to identifying the type of code for executing on the yet unidentified server, instructions for accessing the type of code for executing on the yet unidentified server;
instructions for processing the instructions to determine a particular server of the plurality of servers on which to execute the code;
instructions for enabling the particular server to access the code;
instructions for identifying, based on the type of code identified, one of a plurality of client applications for allowing the particular server to interact with the client system during processing of the code for executing on the particular server of the plurality of servers; and
instructions for processing the code for executing on the particular server.

29. The program product of claim 28 wherein instructions for executing an integrated development environment (IDE) for generating code for executing in the client-server environment, said instructions defining an extensible mechanism further comprise:
instructions for modifying at least one of the view list, server list and launcher list elements and wherein the least one of the view list, server list and launcher list is extensible during run time of the extensible mechanism.

30. The program product of claim 28 wherein instructions for executing an integrated development environment (IDE) for generating code for executing in the client-server environment, said instructions defining an extensible mechanism further comprise:
instructions to launch the client determined in response to the launchable object to execute the code on the one of the plurality of servers.

31. A method of executing code in an integrated development environment, the method comprising:
providing the integrated development environment with an extensible mechanism for handling a plurality of codes, a plurality of servers, and a plurality of clients comprising a partitioning execution of server side code into three stages comprising, a view stage for determining code and a type of code to be run, a server stage for determining a yet unidentified server to execute the type of code determined, and a launcher stage to determine a client for interacting with the particular server to run the type of code determined and a set of lists comprising a view list of input object elements, a server list of server elements and a launcher list of client elements, wherein each of the lists is modifiable enabling the extensible mechanism to handle new codes and a type of code;
maintaining the view list of input object elements, each input object element processing a type of code identified by the input object to output a deployable object;
maintaining the server list of server elements to determine one of a plurality of servers for executing the code, each server element enabling the deployable object to execute on a particular server and outputting a launchable object; and
maintaining the launcher list of client elements to determine one of a plurality of client applications for launching the code on the one of the plurality of servers and wherein at least one of the view list, server list and launcher list is extensible during run time of the extensible mechanism.

32. The method of claim 31 wherein the step of maintaining the at least one of the view list, server list and launcher list comprises at least one of:
   generating a respective element;
   adding a respective element;
   configuring a respective element; and
   deleting a respective element from the at least one of the view list, server list and launcher list.

\* \* \* \* \*